US011341670B2

(12) United States Patent
Nakata et al.

(10) Patent No.: US 11,341,670 B2
(45) Date of Patent: May 24, 2022

(54) INFORMATION PROCESSING DEVICE, INFORMATION PROCESSING METHOD, AND RECORDING MEDIUM

(71) Applicant: Panasonic Intellectual Property Corporation of America, Torrance, CA (US)

(72) Inventors: Yohei Nakata, Osaka (JP); Ryota Fujimura, Kanagawa (JP); Takuya Yamaguchi, Osaka (JP); Yasunori Ishii, Osaka (JP)

(73) Assignee: Panasonic Intellectual Property Corporation of America, Torrance, CA (US)

(*) Notice: Subject to any disclaimer, the term of this patent is extended or adjusted under 35 U.S.C. 154(b) by 0 days.

(21) Appl. No.: 16/902,763

(22) Filed: Jun. 16, 2020

(65) Prior Publication Data
US 2020/0311966 A1    Oct. 1, 2020

Related U.S. Application Data

(63) Continuation of application No. PCT/JP2019/030794, filed on Aug. 6, 2019.
(Continued)

(30) Foreign Application Priority Data

May 14, 2019 (JP) .............. JP2019-091583

(51) Int. Cl.
*G06T 7/70* (2017.01)
*G06N 3/02* (2006.01)

(52) U.S. Cl.
CPC ............ *G06T 7/70* (2017.01); *G06N 3/02* (2013.01); *G06T 2207/20084* (2013.01); *G06T 2207/30252* (2013.01)

(58) Field of Classification Search
CPC combination set(s) only.
See application file for complete search history.

(56) References Cited

U.S. PATENT DOCUMENTS

| 2013/0253754 A1* | 9/2013 | Ferguson | ............ G06V 20/584 |
| | | | 701/28 |
| 2016/0028951 A1 | 1/2016 | Mayuzumi | |

(Continued)

FOREIGN PATENT DOCUMENTS

| EP | 3 032 458 | 6/2016 | |
| EP | 3032458 A2 * | 6/2016 | ......... G06K 9/00791 |

(Continued)

OTHER PUBLICATIONS

Ralph Aeschimann, "Ground or Obstacles? Detecting Clear Paths in Vehicle Navigation", May 26-30, 2015, 2015 IEEE International Conference on Robotics and Automation (ICRA) Washington State Convention Center Seattle, Washington, pp. 3927-3933.*

(Continued)

*Primary Examiner* — Omar S Ismail
(74) *Attorney, Agent, or Firm* — Wenderoth, Lind & Ponack, L.L.P.

(57) ABSTRACT

An information processing device includes a processor. This processor: obtains at least one of first sensor data output from a first sensor and used to determine an ambient environment of a device in which a third sensor is placed, and second sensor data used to determine an orientation of this device; determines a tilt of a plane in a sensing direction of the third sensor with respect to the orientation of the device based on the at least one of the first sensor data and the second sensor data; determines, in accordance with the tilt determined, a processing target area of third sensor data output from the third sensor and used for object detection processing in the sensing direction of the third sensor; and (Continued)

executes the object detection processing using the processing target area determined, of the third sensor data.

10 Claims, 10 Drawing Sheets

Related U.S. Application Data

(60) Provisional application No. 62/747,278, filed on Oct. 18, 2018.

(56) References Cited

U.S. PATENT DOCUMENTS

| | | | |
|---|---|---|---|
| 2016/0328619 A1* | 11/2016 | Yi | G06V 20/58 |
| 2017/0162056 A1* | 6/2017 | Feyerabend | G08G 1/0129 |
| 2018/0082589 A1* | 3/2018 | Park | B60W 30/0956 |
| 2018/0330526 A1* | 11/2018 | Corcoran | H04N 7/181 |
| 2019/0188538 A1* | 6/2019 | Kwant | G06V 20/56 |
| 2019/0205667 A1* | 7/2019 | Avidan | G06V 10/82 |
| 2019/0213438 A1* | 7/2019 | Jones | G06K 9/6274 |
| 2019/0291642 A1* | 9/2019 | Chae | G06T 7/30 |
| 2019/0294934 A1* | 9/2019 | Shestak | G06V 30/194 |

FOREIGN PATENT DOCUMENTS

| | | | |
|---|---|---|---|
| EP | 3 223 195 | 9/2017 | |
| EP | 3223195 A1 * | 9/2017 | ........ B60W 30/0956 |
| JP | 2010-162975 | 7/2010 | |
| JP | 2016-39539 | 3/2016 | |
| JP | 2017-90987 | 5/2017 | |
| WO | 2014/073558 | 5/2014 | |

OTHER PUBLICATIONS

Zoltan Rozsa,"Obstacle Prediction for Automated Guided Vehicles Based on Point Clouds Measured by a Tilted LIDAR Sensor," Feb. 6, 2018,IEEE Transactions on Intelligent Transportation Systems, vol. 19, No. 8, Aug. 2018,pp. 2708-2716.*
R. Manduchi,"Obstacle Detection and Terrain Classification for Autonomous Off-Road Navigation",Jan. 2005,Autonomous Robots 18, 81-102, 2005,pp. 82-96.*
Gustavo Gil,"Is stereo vision a suitable remote sensing approach for motorcycle safety? An analysis of LIDAR, RADAR, and machine vision technologies subjected to the dynamics of a tilting vehicle",Apr. 16-19, 2018,Proceedings of 7th Transport Research Arena TRA 2018, Apr. 16-19, 2018, Vienna, Austria,pp. 4-8.*
International Search Report dated Oct. 21, 2019 in International (PCT) Application No. PCT/JP2019/030794.
Extended European Search Report dated Nov. 10, 2021, in corresponding European Patent Application No. 19873201.8.

* cited by examiner

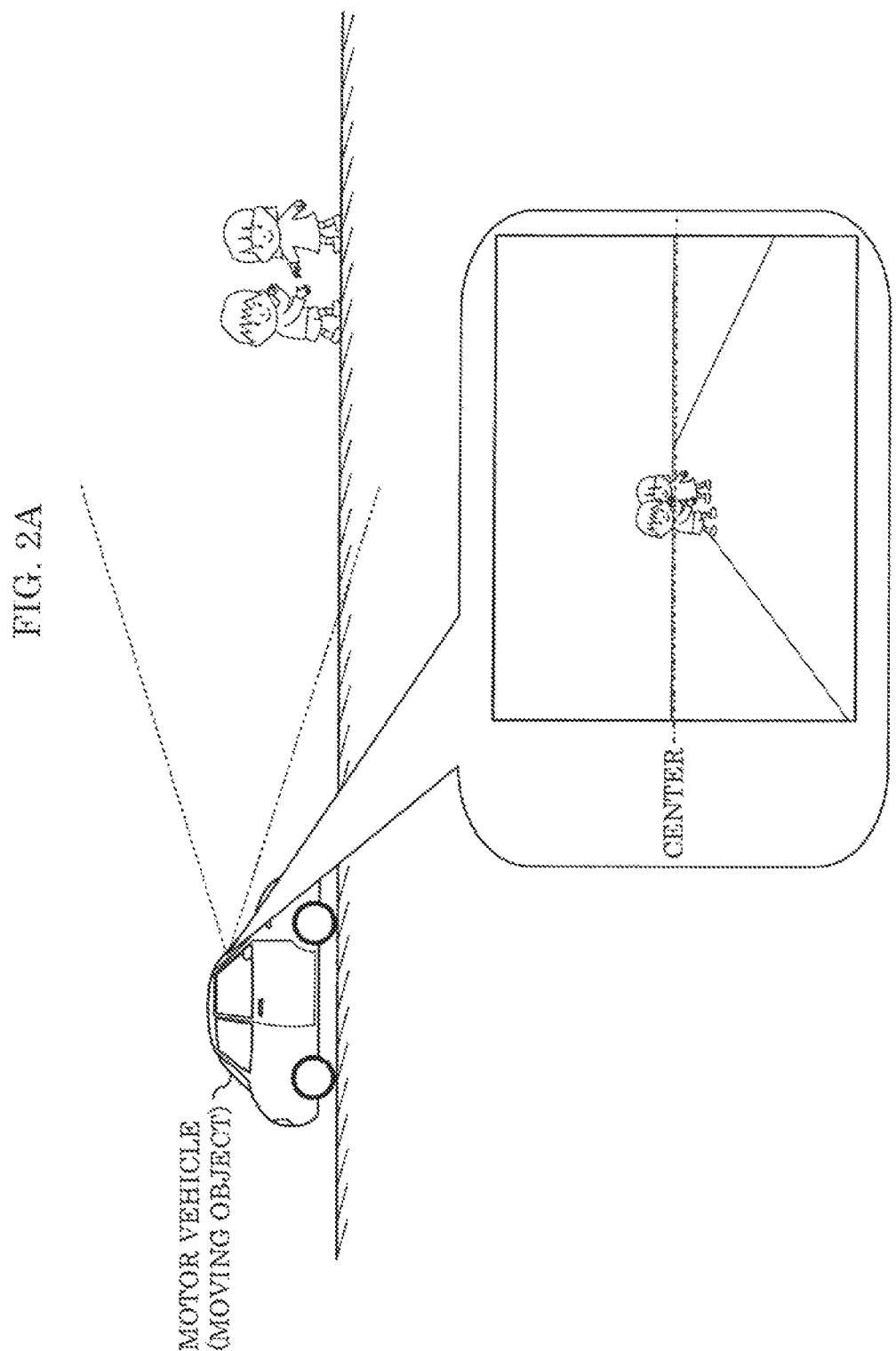

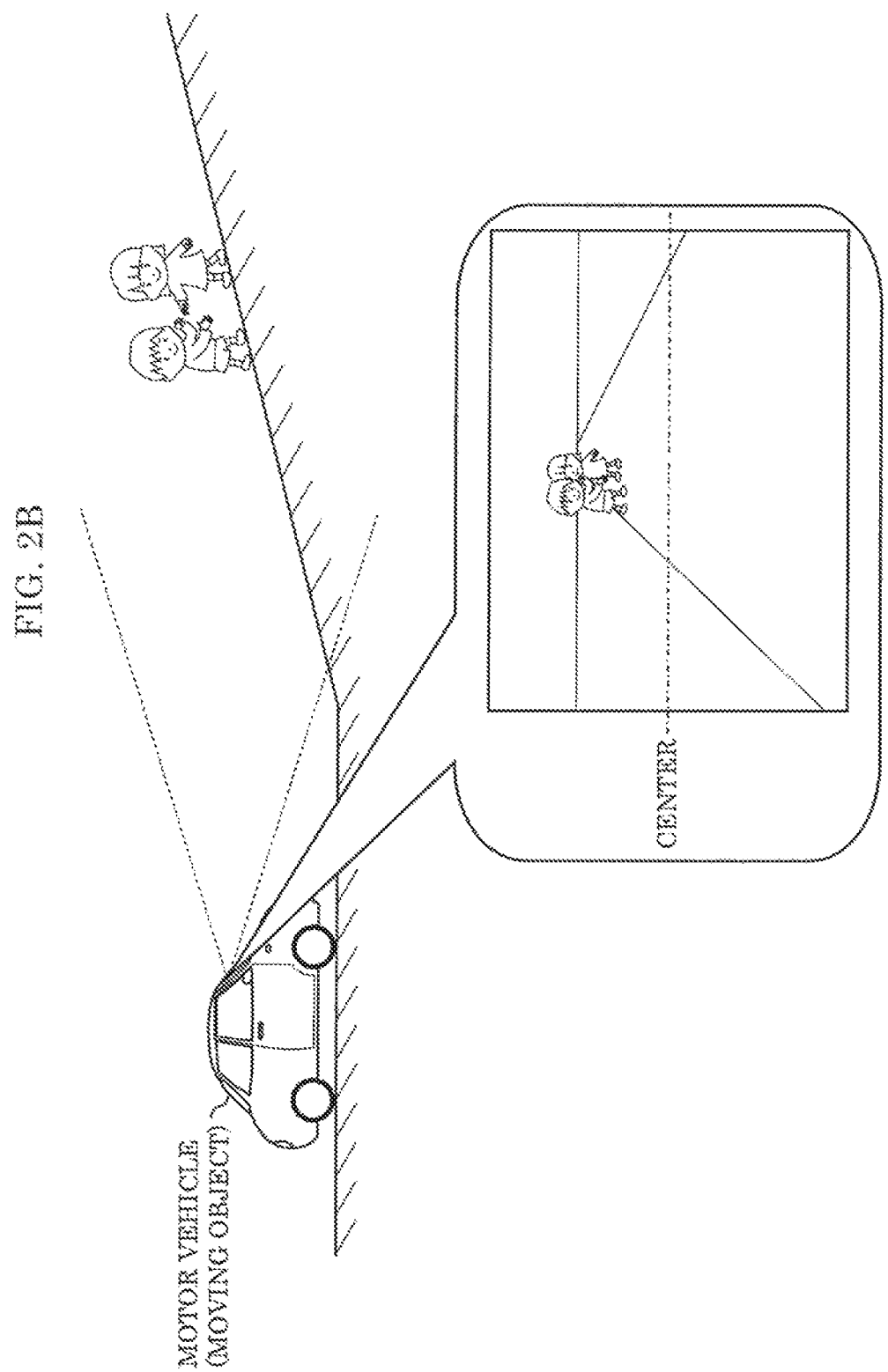

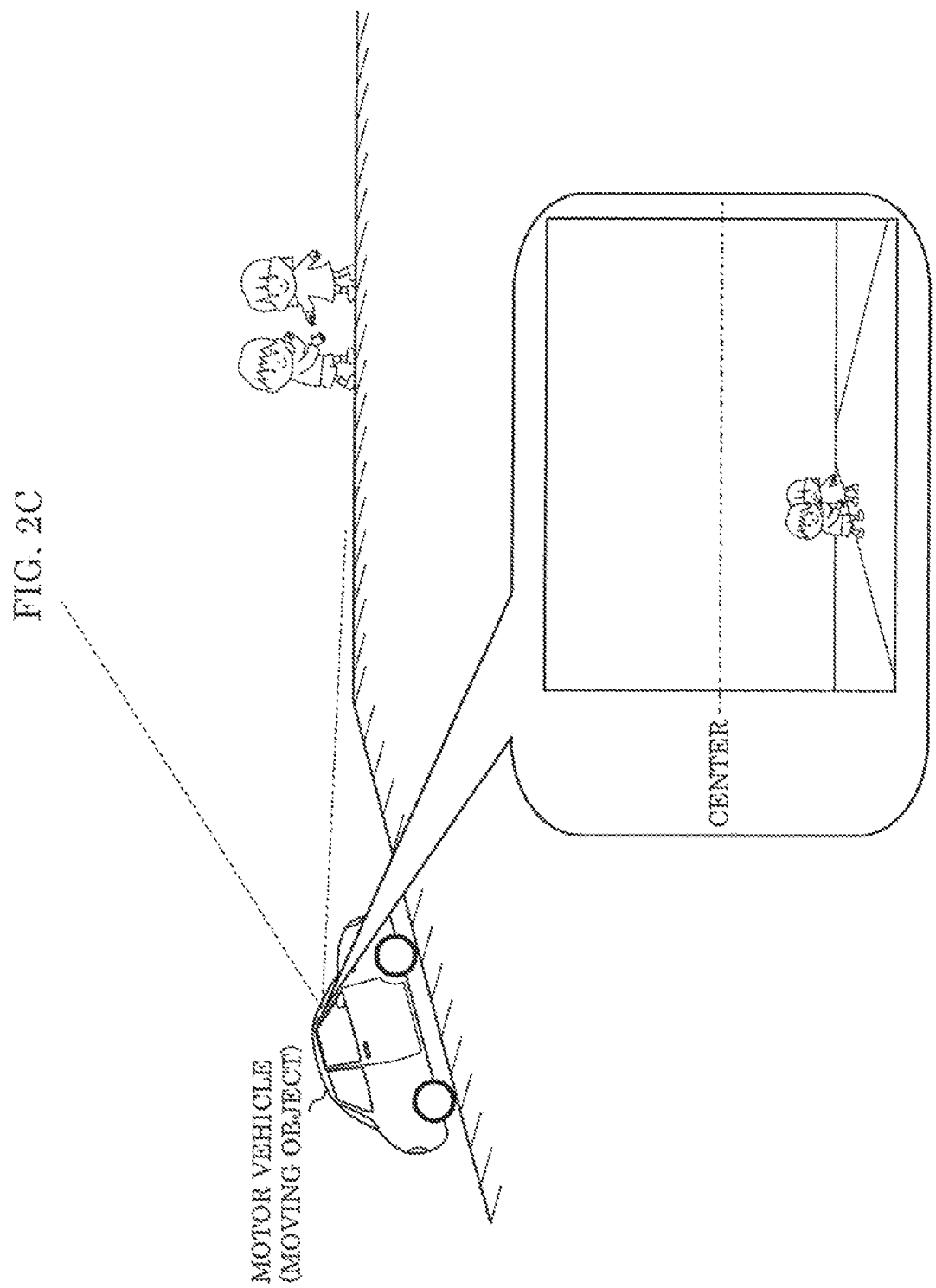

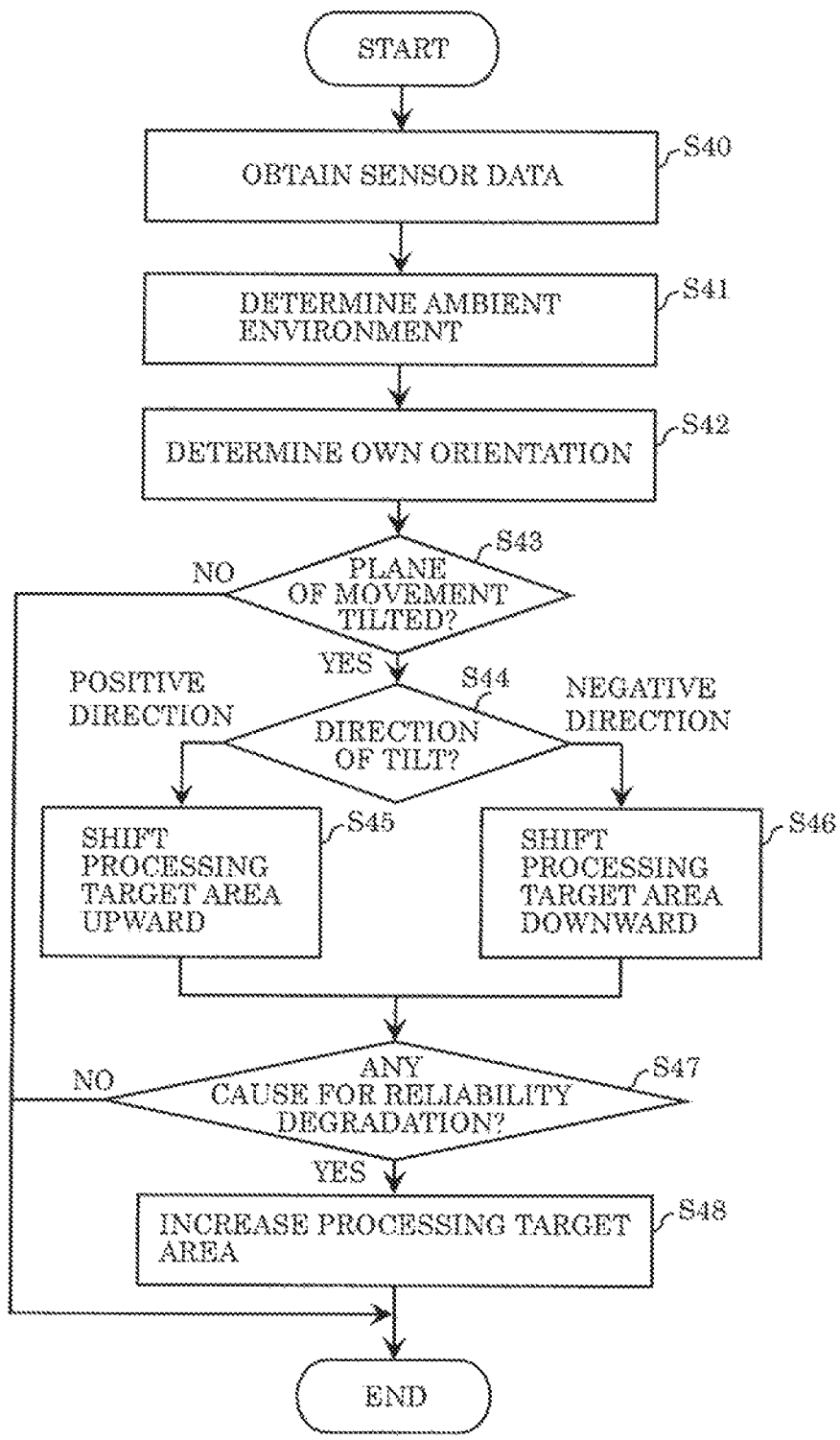

INFORMATION PROCESSING DEVICE, INFORMATION PROCESSING METHOD, AND RECORDING MEDIUM

CROSS REFERENCE TO RELATED APPLICATIONS

This application is a U.S. continuation application of PCT International Patent Application Number PCT/JP2019/030794 filed on Aug. 6, 2019, claiming the benefit of priority of U.S. Provisional Patent Application No. 62/747,278 filed on Oct. 18, 2018 and Japanese Patent Application Number 2019-091583 filed on May 14, 2019, the entire contents of which are hereby incorporated by reference.

BACKGROUND

1. Technical Field

The present disclosure relates to an information processing device, an information processing method, and a recording medium.

2. Description of the Related Art

A suggested technique (see, e.g., Japanese Unexamined Patent Application Publication No. 2017-90987) recognizes the images of vehicles in an image of a parking area captured by an in-vehicle camera within a detection target region, which is preset based on the locations of the top contour images of the vehicles, to identify a vacant lot in the parking area.

SUMMARY

The background art may reduce the effect of reducing the amount of processing for object detection. For example, as preprocessing of the object detection processing, the contour of an object needs to be detected. If there is no object, setting a detection target region is difficult. Accordingly, if the processing of detecting the contour of the object is hard or there is no object, the amount of processing is less reduced or not reduced at all.

It is an objective of the present disclosure to provide an information processing device, a program, and an information processing method capable of improving the effect of reducing the amount of processing for object detection.

An information processing device according to an aspect of the present disclosure includes a processor. The processor: obtains at least one of first sensor data output from a first sensor and used to determine an ambient environment of a device in which a third sensor is placed, and second sensor data output from a second sensor and used to determine an orientation of the device; determines a tilt of a plane in a sensing direction of the third sensor with respect to the orientation based on the at least one of the first sensor data and the second sensor data obtained; determines, in accordance with the tilt, a processing target area of third sensor data output from the third sensor and used for object detection processing in the sensing direction; and executes the object detection processing using the processing target area determined, of the third sensor data.

A recording medium according to an aspect of the present disclosure is a non-transitory computer-readable recording medium having recorded thereon a computer program, which when executed by a computer, causes the computer to execute a method including: obtaining at least one of first sensor data output from a first sensor and used to determine an ambient environment of a device in which a third sensor is placed, and second sensor data output from a second sensor and used to determine an orientation of the device, determining a tilt of a plane in a sensing direction of the third sensor with respect to the orientation based on the at least one of the first sensor data and the second sensor data obtained, determining a processing target area of third sensor data output from the third sensor and used for object detection processing in the sensing direction in accordance with the tilt, and executing the object detection processing using the processing target area determined, of the third sensor data.

An information processing method according to an aspect of the present disclosure uses a processor. The method comprising: obtaining at least one of first sensor data output from a first sensor and used to determine an ambient environment of a device in which a third sensor is placed, and second sensor data output from a second sensor and used to determine an orientation of the device; determining a tilt of a plane in a sensing direction of the third sensor with respect to the orientation based on the at least one of the first sensor data and the second sensor data obtained; determining a processing target area of third sensor data output from the third sensor and used for object detection processing in the sensing direction in accordance with the tilt; and executing the object detection processing using the processing target area determined, of the third sensor data.

The information processing device, the program, and the information processing method according to an aspect of the present disclosure improves the effect of reducing the amount of processing for object detection.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 2A is a schematic diagram for illustrating an example where a plane of movement in front of the path of a moving object is not tilted with respect to an orientation reference plane of the moving object, and a picture captured in this state by a camera placed in the moving object;

FIG. 2B is a schematic diagram for illustrating an example where the plane of movement in front of the path of the moving object is tilted with respect to the orientation reference plane of the moving object, and a picture captured in this state by the camera placed in the moving object;

FIG. 2C is a schematic diagram for illustrating another example where the plane of movement in front of the path of the moving object is tilted with respect to the orientation reference plane of the moving object, and a picture captured in this state by the camera placed in the moving object;

FIG. 4 is a flow chart showing an example procedure of processing by performed by the information processing device for determining a target area for image recognition processing, out of target data;

DETAILED DESCRIPTION OF THE EMBODIMENT

Underlying Knowledge Forming Basis of the Present Disclosure

Some moving objects, such as motor vehicles, in recent years have driver assistance or autonomous moving (autonomous driving) functions. Some of the functions are performed using results of object detection based on data output from a sensor that senses the direction of travel of a moving object. Such object detection is performed through image recognition using image data output from an image sensor, for example. This image recognition is one of application fields of recent machine learning techniques such as deep learning, and further improvements are being researched. In the research, reduction in the amount of calculation is considered as a method of increasing the speed of image recognition processing and reducing power consumption required for the image recognition processing. For example, as preprocessing of the image recognition processing of an image input to an image processing device, the input image is cropped to remove and exclude a predetermined region from a target of the image recognition processing. This reduces the amount of calculation.

Figure 1:
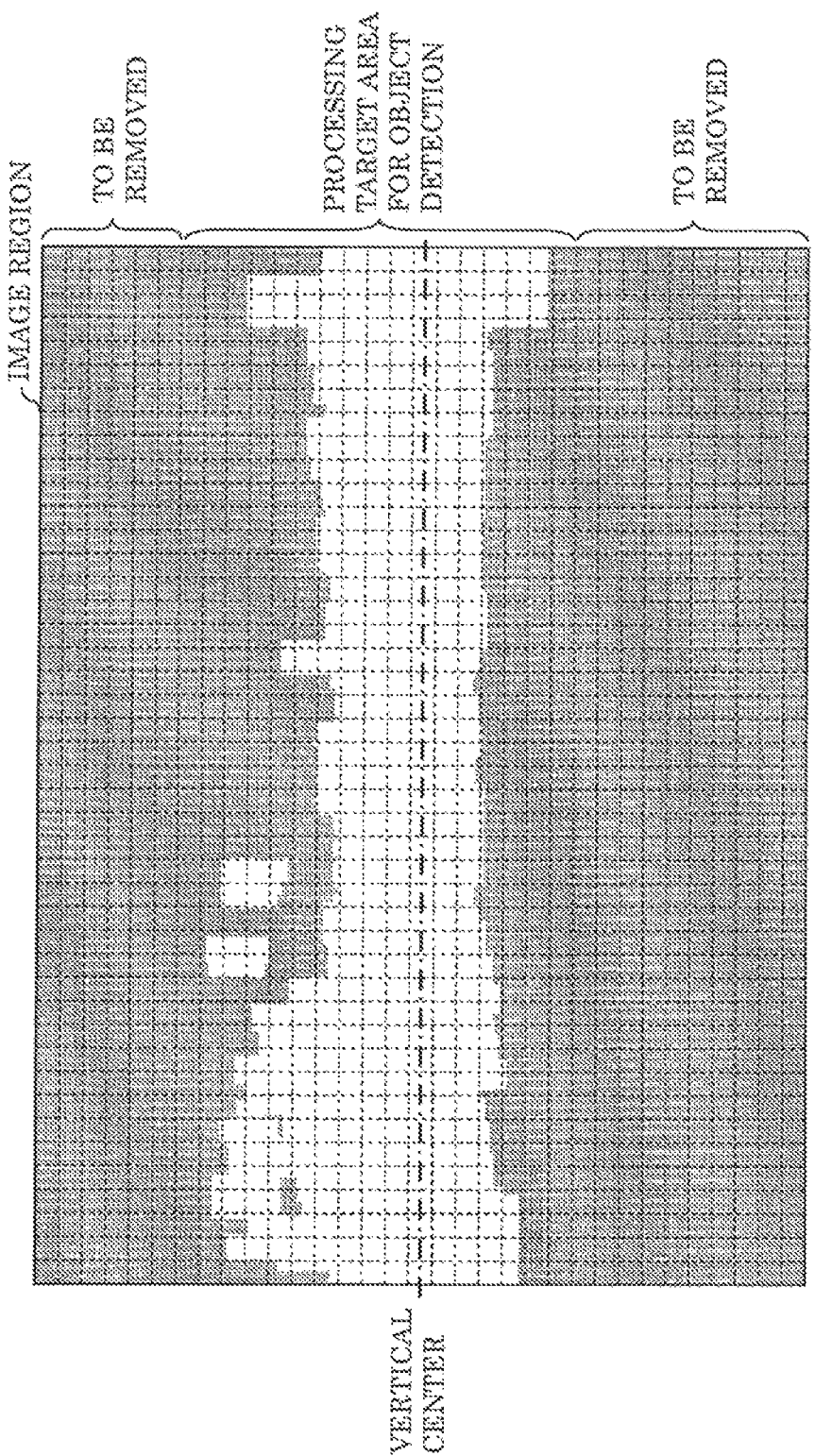
FIG. 1 is a schematic diagram of a video in front of a motor vehicle including a region in which the image of a detection target object is detected and regions in which no image is detected.

FIG. 1 is a schematic diagram showing regions of a picture group captured by a camera placed in a motor vehicle traveling on a flat road. The image of a detection target object, such as a pedestrian or an obstacle, is detected in one of the regions, whereas no image is detected in the other regions. Blocks defined by the broken lines in the figure are cells, each m a predetermined size including a plurality of pixels, and obtained by dividing the entire region of a picture captured by the camera. The cells herein are the synonym of the pixels obtained by down-sampling the picture captured by the camera at a certain magnification. Shown in white is a region of the pixels that have included one or more times in a bounding box including the detection target object. Shaded are the regions of the pixels that have never included in a bounding box. It is found from FIG. 1 that the image of the detection target object is located around the vertical center, which is indicated by a one-dot chain line in the figure, in the image region. That is, the shaded regions can be regarded as the regions that include no image of the detection target object or regions that fail to contribute to a result of objection detection. As the preprocessing described above, cropping is performed in view of the locational tendency of the image of the detection target object in an input image. Certain regions (e.g., two regions "to be removed" in the figure) from the top and bottom of the image region are removed. The area (e.g., the "processing target area for object detection") remaining as a result of the preprocessing and positioned around the center of the original image region is regarded as the "target of image recognition processing". This reduces the amount of calculation as compared to the case where the entire image region is regarded as the "target of image recognition processing".

The determination on the target region for image recognition processing based on the idea described above has however the following problem. During the travel of a moving object, the region of the picture that may include the image of a detection target object changes due to, for example, a bumpy path or a change in the orientation of the moving object. The image of the detection target object captured outside the region is then excluded from the target region for image recognition processing.

After repetitive studies for addressing the problem, the present inventors have thought of the following information processing device, program, and information processing method capable of changing a target region for image recognition processing (or a region to be excluded from the image recognition processing in preprocessing) in accordance with a change in the region that may include the image of a detection target object.

The information processing device according to an aspect of the present disclosure a processor. The processor: obtains at least one of first sensor data output from a first sensor and used to determine an ambient environment of a device in which a third sensor is placed, and second sensor data output from a second sensor and used to determine an orientation of the device; determines a tilt of a plane in a sensing direction of the third sensor with respect to the orientation based on the at least one of the first sensor data and the second sensor data obtained; determines, in accordance with the tilt, a processing target area of third sensor data output from the third sensor and used for object detection processing in the sensing direction; and executes the object detection processing using the processing target area determined, of the third sensor data.

For example, assume that the device is a motor vehicle, which is a moving object, as in the case described above. A flat road surface extends within the field of view in front of the traveling path from the current position of the motor vehicle. In the motor vehicle, a camera, which is a third sensor, is placed to capture the image of a detection target object, which is present in front of the path, within a region around the vertical center of a picture. The plane (hereinafter referred to as a "orientation reference plane" of the motor vehicle) parallel to the longitudinal direction and the transverse direction of the motor vehicle in the straight-ahead orientation and perpendicular to the vertical direction is parallel to the road surface in front of the traveling path. Note that these directions are here determined with the straight-ahead direction in the designing of this motor vehicle regarded as the front, and depend on the orientation of the motor vehicle, that is, the tilt of the plane in contact with the tires of the motor vehicle. The longitudinal direction is not limited to the horizontal direction, whereas the vertical direction is not limited to the strictly vertical direction. The slight unevenness of the road surface is smoothened and approximated as an imaginary flat plane. This imaginary flat plane is hereinafter referred to as a "plane of movement". That is, this plane of movement is not tilted with respect to the orientation reference plane. FIG. 2A is a schematic diagram for illustrating an example where the plane of movement in front of the path of the moving object is, in this manner, not tilted with respect to the orientation reference plane, and a picture captured in this state by the camera placed in the moving object. In FIG. 2A, the broken lines extending from the motor vehicle indicate the top and bottom of the shooting range of this camera. This also applies to FIGS. 2B and 2C which will be described later. The picture captured in this state by the camera includes the images of people, who are example detection targets, in front of the motor vehicle as shown in the balloon, for example, in the figure. In the figure, the one-dot chain line crossing the image region is the bisector of the height of this image region. The same applies to FIG. 2B and FIG. 2C which will be described later. The information processing device with the configuration described above determines, in this state, the region of the picture around the vertical center as the "processing target area" to be used for the image recognition processing for object detection. The device performs no image recognition processing in the other areas.

By contrast, assume that there is an uphill in front of this motor vehicle, which is traveling on a horizontal place at present, in the direction of travel. The image of the detection target object, such as a pedestrian, on this uphill may be captured in the region of the picture above the vicinity of the vertical center. In this case, the plane of movement is tilted with respect to the orientation reference plane. FIG. 2B is a schematic diagram for illustrating an example where the plane of movement in front of the path of the moving object is, in this manner, tilted with respect to the orientation reference plane, and a picture captured in this state by the camera placed in the moving object. In this example, the image of the detection target object in front of the motor vehicle is close to the top of the picture, as compared to the state shown in FIG. 2A. The information processing device with the configuration described above determines, in this state, an upper part of the picture as the "processing target area" to be used for the image recognition processing for object detection. The device performs no image recognition processing in the other areas.

Assume that there is a horizontal road in front of this motor vehicle, which is traveling on an uphill at present, in the direction of travel. The image of the detection target object, such as a pedestrian, on this horizontal road may be captured in the region of the picture below the vicinity of the vertical center. In this case as well, the plane of movement is tilted with respect to the orientation reference plane. FIG. 2C is a schematic diagram for illustrating another example where the plane of movement in front of the path of the moving object is tilted with respect to the orientation reference plane, and a picture captured in this state by the camera placed in the moving object. In the picture captured in this state by this camera, as shown in the balloon, for example, in the figure, the image of the detection target object in front of the motor vehicle is close to the bottom of the picture, as compared to the state shown in FIG. 2A. The information processing device with the configuration described above determines, in this state, a lower part of the picture as the "processing target area" to be used for the image recognition processing for object detection. The device performs no image recognition processing in the other areas.

In this manner, out of third sensor data, the target area for the image recognition processing is changed in accordance with the tilt of the plane of movement in front of the traveling path of the moving object with respect to the orientation reference plane of the moving object. The tilt may be hereinafter referred to as a "tilt of the plane of movement in front of the traveling path with respect to the own orientation of the moving object" or simply as a "tilt of the plane of movement with respect to the moving object". The "own orientation" will be described later. That is, the area to be excluded from the target of the image recognition processing is dynamically changed in accordance with the tilt. As a result, efficient object detection processing with a smaller amount of calculation is achieved, while reducing the risk of excluding the area of the third sensor data indicating the detection target object from the target area for the object detection processing.

The processor may determine a part of the third sensor data as the processing target area, if the tilt is within a predetermined range, determine a part wider than the part of the third sensor data as the processing target area, if the tilt is out of the predetermined range, and make a processing cycle of the object detection processing longer in a case where the tilt is out of the predetermined range than in a case where the tilt is within the predetermined range. The device may be a moving object, and the processor may request the moving object for deceleration, if the tilt is out of the predetermined range. The device may be a moving object, and the processor may issue an alert to a user of the moving object, if the tilt is out of the predetermined range.

Depending on the degree of the tilt of the plane of movement with respect to the moving object, only an area of the third sensor data may fail to include the area indicating the detection target object. In this case, the entire third sensor data is used as the target of the object detection processing to reduce the risk of leaving the detection target object undetected. Note that the object detection processing of the entire third sensor data may require a longer time than object detection processing of only a part of the third sensor data to provide the accuracy required for safe travel of the moving object. In addition, the moving object may decelerate for safe travel of the moving object, depending on the time for this object detection processing. An alert indicating that the present situation affects the speed of the object detection processing may be issued to give the user of the moving object an opportunity of considering decelerating the moving object or changing the path.

The size of the processing target area may be changed in accordance with a factor influencing a reliability of the object detection processing.

Depending on the conditions of the device or the ambient environment when the third sensor obtains the third sensor data, the reliability of the result of the object detection processing may deteriorate. For example, assume that the third sensor data is the image data, and the device is a moving object traveling at a relatively high speed or the orientation of the device varies relatively frequently. In this case, the position of the image of the target to be detected in the picture is likely to change as compared to the other cases. Accordingly, the smaller the area of the third sensor data used as the target of the object detection processing is, the more likely the target to be detected is left undetected, that is, the lower the reliability of the result of the object detection processing is. As in this configuration, the object detection processing using a larger area of the third sensor data, for example, a wider region of a picture reduces reliability degradation.

The object detection processing may be executed by inputting the processing target area into one or more trained models. The one or more trained models may be a plurality of trained models. The processor may select one of the plurality of trained models in accordance with the tilt, and input the processing target area into the one selected.

Depending on the area of the third sensor data used as a target of the object detection processing in accordance with the tilt of the plane with respect to the orientation of the device, how the detection target object appears on the data may be different. In a picture captured by, for example, a camera, the image of an object is in different shapes between the case where the object appears near the center of the picture and the case where the object appears on the periphery of the picture. In a picture captured with a lens with a greater angle of view, this different is more significant. The configuration described above improves the accuracy of objection detection using an individual model according to such a difference.

Each of the trained models may be a multilayer neural network. The processor: may obtain a distance from the device to a starting point of the tilt; and determine the processing target area for a layer of the trained model according to the distance.

This configuration allows more accurate detection of detection target objects that may be present at different distances from the device on the plane extending in the sensing direction of the third sensor and inclined with respect to the orientation of the device.

The processor may determine the processing target area by shifting the processing target area in accordance with the tilt.

A program according to an aspect of the present disclosure is in an information processing device including a processor. The program is executed by the processor to cause the processor to obtain at least one of first sensor data output from a first sensor and used to determine an ambient environment of a device in which a third sensor is placed, and second sensor data output from a second sensor and used to determine an orientation of the device, determine a tilt of a plane in a sensing direction of the third sensor with respect to the orientation based on the at least one of the first sensor data and the second sensor data obtained, determine a processing target area of third sensor data output from the third sensor and used for object detection processing in the sensing direction in accordance with the tilt, and execute the object detection processing using the processing target area determined, of the third sensor data.

With this configuration, efficient object detection processing with a smaller amount of calculation is achieved, while reducing the risk of excluding the area of the third sensor data indicating the detection target object from the target area for the object detection processing.

An information processing method according to an aspect of the present disclosure uses a processor. The method includes: obtaining at least one of first sensor data output from a first sensor and used to determine an ambient environment of a device in which a third sensor is placed, and second sensor data output from a second sensor and used to determine an orientation of the device; determining a tilt of a plane in a sensing direction of the third sensor with respect to the orientation based on the at least one of the first sensor data and the second sensor data obtained; determining a processing target area of third sensor data output from the third sensor and used for object detection processing in the sensing direction in accordance with the tilt; and executing the object detection processing using the processing target area determined, of the third sensor data.

With this configuration, efficient object detection processing with a smaller amount of calculation is achieved, while reducing the risk of excluding the area of the third sensor data indicating the detection target object from the target area for the object detection processing.

General and specific aspects disclosed above may be implemented using a system, an integrated circuit, a computer-readable recording medium such as a compact disc read-only memory (CD-ROM), or any combination of devices, systems, methods, integrated circuits, computer programs, or recording media.

Now, a specific example of the information processing device, the program, and the information processing method according to an aspect of the present disclosure will be described with reference to the drawings. The embodiment described therein is a mere specific example of the present disclosure. The numerical values, shapes, materials, constituent elements, the arrangement and connection of the constituent elements, steps, step orders etc. shown in the following embodiment are thus mere examples, and are not intended to limit the scope of the present disclosure. Among the constituent elements in the following embodiment, those not recited in any of the independent claims defining the embodiment according to an aspect of the present disclosure are described as optional constituent elements. The embodiment of the present disclosure is not limited to the current independent claims but may include other possible independent claims. The figures are schematic representations of the concept of the present disclosure. The shapes, numbers, locations, scales, and magnitude relationships shown in the figures and not necessarily drawn strictly to scale.

Embodiment

1. Configuration of Information Processing Device

Figure 3:
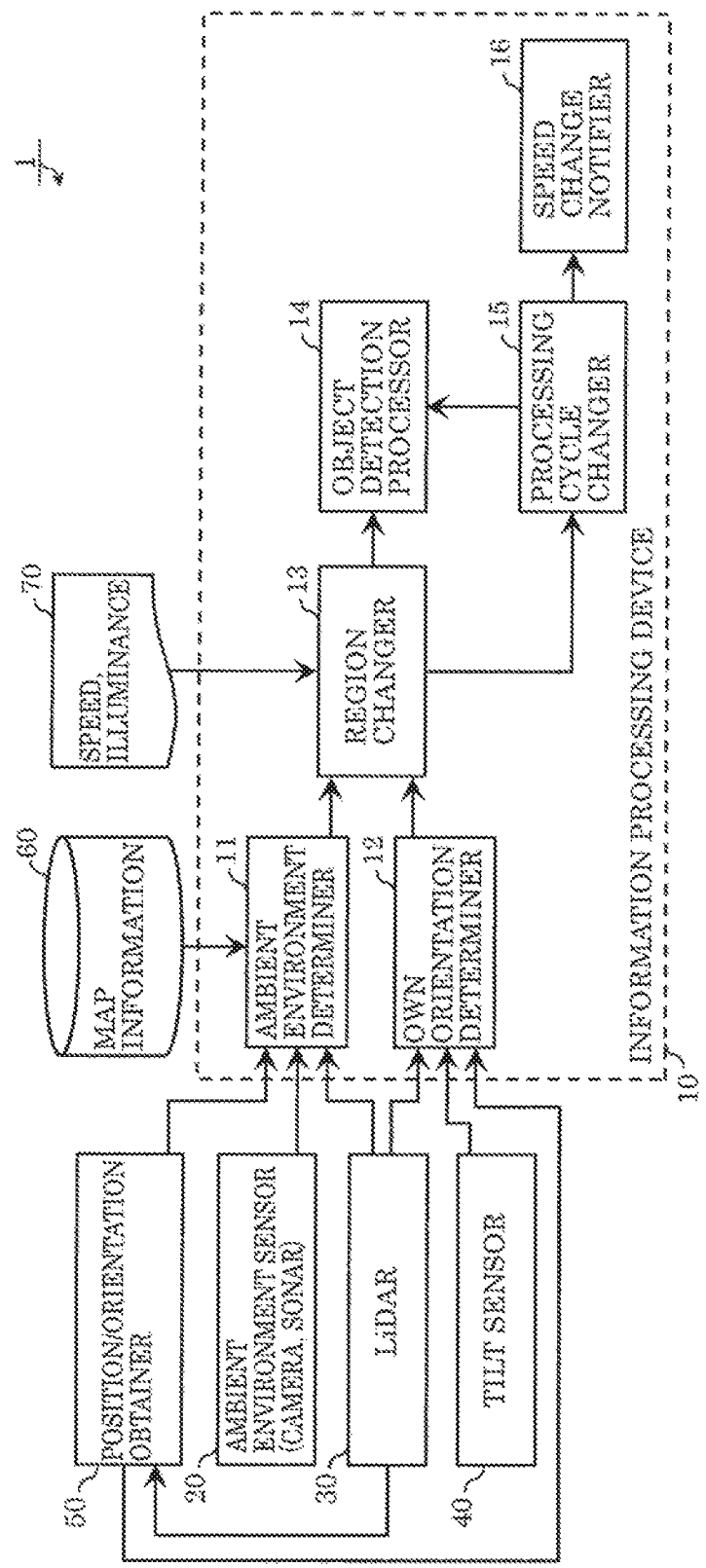
FIG. 3 is a block diagram showing an example configuration of an information processing device according to an embodiment.

FIG. 3 is a block diagram showing an example configuration of an information processing device according to an embodiment. Information processing device 10 according to this embodiment is a constituent element of object detection system 1 included in a moving object such as a motor vehicle. The device receives, as an input, sensor data to be used for object detection. In addition, the device determines the tilt of a plane of movement in front of the traveling path of the moving object with respect to the moving object based on the sensor data. The device executes then the object detection using an area of the sensor data determined in accordance with this tilt.

As shown in FIG. 3, information processing device 10 functioning in this manner includes ambient environment determiner 11, own orientation determiner 12, region changer 13, object detection processor 14, processing cycle changer 15, and speed change notifier 16.

Information processing device 10 is a microcontroller including a processor and a memory, for example. These are functional constituent elements achieved by the processor executing one or more programs stored in the memory. The constituent elements will be described later. This microcontroller is, for example, as a component of an electronic control unit (ECU) constituting an in-vehicle network system, mounted in a motor vehicle which is a moving object. The information processing device according to the present disclosure is useful in various moving objects. This embodiment will now be described using as a main example, information processing device 10 as a microcontroller for an ECU mounted in a motor vehicle.

Information processing device 10 receives sensor data output from ambient environment sensor 20, such as a sonar sensor or an image sensor of an in-vehicle camera, light detection and ranging or laser imaging detection and ranging (LiDAR) 30 and tilt sensor 40 such as a gyro sensor.

Position/orientation information from position/orientation obtainer 50, which obtains information on the current position or orientation of the motor vehicle, and map information 60 contained in an in-vehicle car navigation system (not shown) may also be available for information processing device 10. In addition, information on the current speed of the motor vehicle or ambient brightness (illuminance) around the motor vehicle (i.e., speed/illuminance 70 in the figure), for example, may also be input. The processing of these data and information will be described below in the explanation of the constituent elements of information processing device 10 and the procedure of the processing of information processing device 10.

Ambient environment determiner 11 determines the ambient environment of the motor vehicle using the sensor data output from ambient environment sensor 20 or LiDAR 30. The ambient environment here means the shape of the road surface in front of the path of the motor vehicle, that is, the road surface on which the vehicle travels, or the direction and degree of the tilt of the road surface. The road surface in front of the path, which is to be determined as an ambient environment, is an example of the plane of movement in this embodiment. What ambient environment determiner 11 may use for the determination on the ambient environment is not limited to these types of sensor data. For example, the information on the current position of the motor vehicle supplied from position/orientation obtainer 50 and information on the landscape or the shape of the road included in map information 60 may be used. In map information 60, the landscape or the shape of the road may be represented by information on the height or by information on more specific three-dimensional shape, if map information 60 is three-dimensional map information. If the position of the motor vehicle is known, the information on the shape of the road surface in front of the path of this motor vehicle in that position is available together with such map information 60.

Position/orientation obtainer 50 is a functional constituent element achieved by a processor executing one or more programs in information processing device 10 or in another information processing device including the processor and a memory and communicatively connected to information processing device 10. Position/orientation obtainer 50 functions to obtain the position and/or orientation of the motor vehicle using the information output from LiDAR 30 or a receiver of a positioning system such as a global positioning system (GPS, not shown), map information 60, or a combination of these types of information.

Own orientation determiner 12 determines the own orientation using the sensor data output from tilt sensor 40 or LiDAR 30. Tilt sensor 40 may be included in a motor vehicle, for example, in a car navigation system or a camera (hereinafter referred to as an "in-vehicle camera") placed in a motor vehicle.

The own orientation here is the orientation of the motor vehicle or the orientation of the in-vehicle camera or a kind of an in-vehicle sensor (a third sensor which will be described later) corresponding to the in-vehicle camera. The relative relation between the orientations of the in-vehicle camera and the motor vehicle are available when placing the in-vehicle camera into the motor vehicle. If one of the orientations is known using sensor data, the other orientation can be calculated. For example, the own orientation can by represented by the direction and degree of the tilt of a fixed imaginary line or imaginary plane definable relative to the body of the motor vehicle, for example, the orientation reference plane described above, with respect to the vertical line. As another example, the own orientation may be represented by the direction and degree of the tilt of a fixed imaginary line or imaginary plane definable relative to the in-vehicle camera, for example, the line parallel to the optical axis or the plane parallel to the light receiving surface of the image sensor, with respect to the vertical line. Note that what own orientation determiner 12 uses for the determination on the own orientation is not limited to these types of sensor data. For example, the information on the current position of the motor vehicle supplied from position/orientation obtainer 50 and the information indicating landscape or the shape of the road included in map information 60 may be used. Note that the expression of the "position of the motor vehicle (or the moving object)" in the present disclosure indicates a reference position freely set within a space occupied by the moving object. For example, this reference position may be the position of the in-vehicle camera or the third sensor which will be described later.

Region changer 13 determines the tilt of the plane of movement with respect to the own orientation based on the ambient environment, which a result of determination by ambient environment determiner 11, and the own orientation of the moving object, which is a result of determination by own orientation determiner 12. The region changer determines, out of the sensor data input from the in-vehicle camera, that is, the image data in this example, the target area (hereinafter simply referred to as a "processing target area") for image recognition processing performed by object detection processor 14 in accordance with the determined tilt. Region changer 13 determines the processing target area according to this tilt which is the determination result, regardless of whether the own orientation is the orientation of the motor vehicle or the orientation of the in-vehicle camera. For example, a program achieving region changer 13 defines the direction in which the processing target area moves in accordance with the direction of the tilt which is the determination result. The processing target area may be determined in accordance with the direction of the determined tilt. Alternatively, a memory included in information processing device 10 may store a table representing the correlation between the direction and degree of the tilt, which is the determination result, and the coordinate indicating the processing target area of the image region indicated by the image data. Region changer 13, which has determined the tilt, may obtain the associated coordinate with reference to this table to determine the processing target area.

For example, the image data cropped as described above by region changer 13 to retain this processing target area may be input from region changer 13 to object detection processor 14. Alternatively, uncropped image data and the information, such as the coordinate, indicating the range of the processing target area may be input from region changer 13 to object detection processor 14. Object detection processor 14 may crop the data, or image recognition processing may be simply executed for the range of the processing target area indicated by this information. If there is a change in the processing target area, the information, such as the coordinate, indicating a new processing target area may be input from region changer 13 to object detection processor 14. Alternatively, information (e.g., the direction or the amount of movement) for shifting the processing target area may be input.

Region changer 13 may further determine the size of the processing target area. The entire region of the image data may be determined as the size of the processing target area, which is equivalent to the determination not to perform cropping. The size of the processing target area may be determined in accordance with, for example, the size of the tilt determined as described above. Alternatively, the size may be determined in accordance with the speed of the moving object, the brightness around the moving object or in front of the path, or a change or difference in these factors. These types of information may be a cause that may affect the reliability of object detection. As a specific example, the brightness significantly differs between inside and outside a multistory parking space, particularly, in the daytime on a sunny day, for example. Accordingly, in a picture captured by the in vehicle camera of the motor vehicle heading for the exit of the multistory parking space, a detection target object present outside the exit may not appear recognizably in image recognition processing. In any tilt, speed, and brightness condition, object detection processor 14, which will be described below, performs image recognition processing at a reliability required for safe travel of the moving object. More specifically, region changer 13 increases the processing target area if the current size of the processing target area fails to exhibit required reliability. Note that the speed of the moving object may be obtained from a speed measurement means according to the type of the moving object, for example, in the example of a motor vehicle, from an ECU that calculates the speed of the vehicle based on the rotational speed of the axle measured by a sensor. Alternatively, a speed to be used may be calculated based on the position information obtained by a positioning system included in the moving object or the optical flow estimated from a picture captured by a camera. The brightness may be obtained based on the data on the picture captured by a camera placed in the moving object or the sensor data output from a brightness sensor included extra in the moving object. The cause for reliability degradation of the image recognition processing is not limited to what has been described above. Other examples may include the conditions such as the shape or the harness of the path or the shake or vibration of the moving object caused by wind.

With an increase in the processing target area, region changer 13 may lengthen the cycle of the image recognition processing performed by object detection processor 14 as necessary. The determined cycle of the image processing is notified to processing cycle changer 15 which will be described later. Region changer 13 may determine deceleration of the moving object in addition to or in place of the lengthening of the processing cycle. Region changer 13, which has determined this deceleration, outputs an instruction on or a request for the deceleration to a control device that controls the speed of the moving object, for example, an ECU that controls a drive mechanism, and/or a brake ECU.

Object detection processor 14 executes image detection or image recognition processing such as segmentation of the processing target area of the image data determined by region changer 13. For example, object detection processor 14 contains a trained model trained for image recognition. This image recognition processing is executed by inputting the processing target area described above of the image data to this trained model. The result of the image recognition processing output from object detection processor 14 is utilized by, for example, a driver assistance system or an autonomous driving system in a motor vehicle, for determination on the drive control or notification to a user.

Processing cycle changer 15 receives the notification from region changer 13 described above, and changes the cycle of the image recognition processing performed by object detection processor 14 in accordance with this notification. The execution of this change is notified from processing cycle changer 15 to speed change notifier 16 which will be described below.

Speed change notifier 16, which have received this notification from processing cycle changer 15, presents the information on this change to the user of the motor vehicle. This information is presented as an alert notifying, for example, a change in the processing cycle and its influence. Alternatively, the information may prompt the user for an action such as an operation. The information may be supplied in the form of a display on an in-vehicle display device such as a monitor or an instrument panel, or an alarm or a voice through a speaker.

The several types of sensors, which are sources of the sensor data obtained by functional constituent elements, have been described above. The sources of the sensor data described above for the functional constituent elements are not limited to what is shown in FIG. 3. For example, the image sensor of the in-vehicle camera may function as ambient environment sensor 20 that supplies the sensor data to ambient environment determiner 11. The sensor data may be used for the determination on the own orientation by own orientation determiner 12 or may be data to be subjected to image recognition. The data output from the LiDAR may be, as described above, the sensor data on the ambient environment and may be the data used for determination on the orientation of the moving object. The data may be, as point cloud data, used to detect an object in front of the travel path in addition to or in place of the image data described above. Various types of sensors including sensors (for example, various types of depth sensors) not named above will be classified into the following three types. A first sensor according to the present disclosure is a sensor that outputs sensor data used to determine the ambient environment. A second sensor according to the present disclosure is a sensor that outputs sensor data used to determine the own orientation. The third sensor according to the present disclosure is a sensor that outputs sensor data subjected to the processing of detecting an object in front of the moving object in the direction of travel. The output sensor data may be used alone or in combination with the other information such as the position information and the map information.

2. Operation

Now, an operation of information processing device 10 with the configuration described above will be described still using the example where the device is mounted in the motor vehicle. FIG. 4 is a flow chart showing an example procedure of processing for determination on the processing target area of data, which is the target of the image recognition processing executed by information processing device 10.

In (S40), information processing device 10 obtains sensor data from the first sensor, the second sensor, and the third sensor. The sensor data obtained from the first, second, and third sensors will be referred to as "first sensor data", "second sensor data", and "third sensor data", respectively. The device may obtain map information 60 or information from position/orientation obtainer 50. In this example, information processing device 10 also obtains the information on the speed of the motor vehicle or the brightness around the motor vehicle.

In (S41), ambient environment determiner 11 determines the ambient environment of the motor vehicle, that is, the shape of the plane of movement, for example, in front of the path of the motor vehicle, based on the first sensor data.

In (S42), own orientation determiner 12 determines the own orientation based on the second sensor data.

Figure 5A:
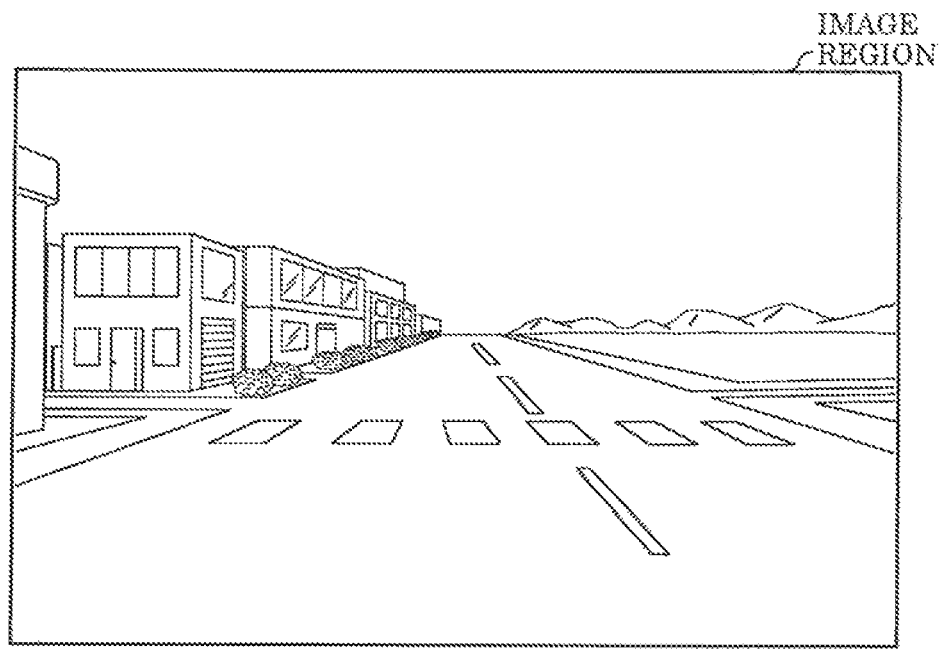
FIG. 5A is a schematic diagram showing an example picture captured in front of the path of the moving object and input to the information processing device.
Figure 5B:
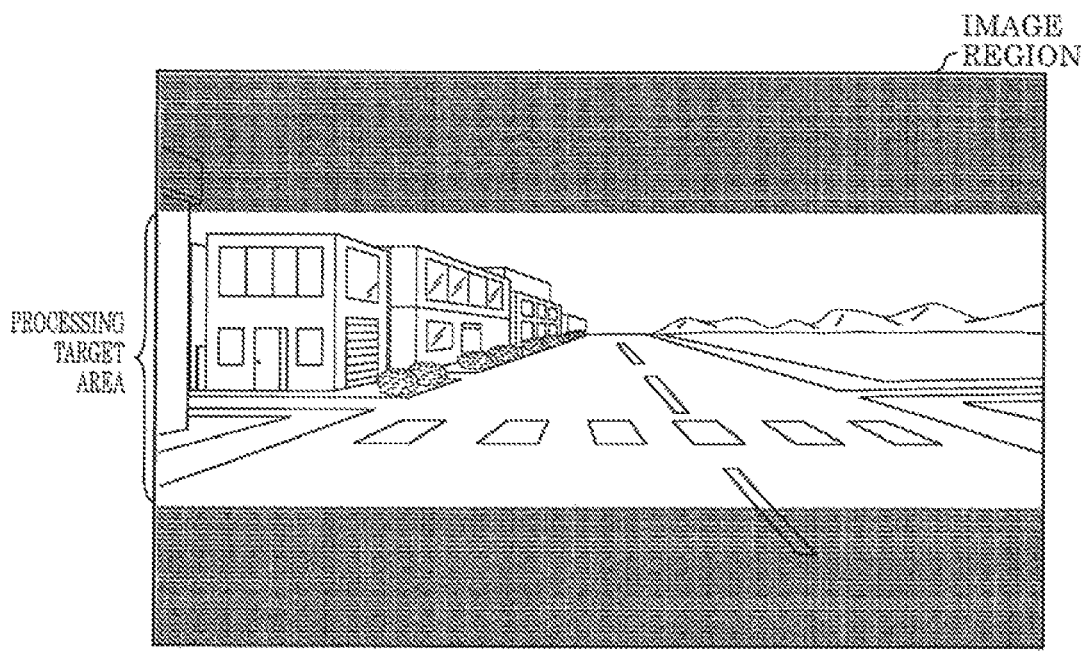
FIG. 5B is a schematic diagram showing an example target area for image recognition processing, out of the picture shown in FIG. 5A.

In (S43), region changer 13 determines whether or not the plane of movement in front of the path of the motor vehicle is tilted with respect to the own orientation based on the ambient environment and the own orientation. If the plane is not tilted (i.e., No in S43), the procedure of determining the processing target area ends without changing the processing target area of the third sensor data. That is, if the third sensor data is image data, object detection processor 14 executes image recognition processing on the processing target area of this image data, which has been preset for the state where the plane of movement in front of the path of the motor vehicle is not tilted with respect to the own orientation. Assume that this preset processing target area is located around the vertical center of the image in this example. FIG. 5A is a schematic diagram showing an example picture indicated by the third sensor data input from the in-vehicle camera to information processing device 10. FIG. 5B is a schematic diagram showing an example preset target area for image recognition processing, out of the entire region of the picture shown in FIG. 5A. In FIG. 5B, the rectangle regions with halftone dots along the top and bottom are the regions to be removed by, for example, cropping processing. The region without halftone dots and located around the vertical center in the uncropped picture is the target of the image recognition processing performed by object detection processor 14. If the plane is tilted (Yes in S43), the processing proceeds to step S44.

In (S44), region changer 13 obtains the direction of the tilt determined in step S43. In this example, assume that the front end of the vehicle body is located above the current position, when the motor vehicle moves forward onto the plane of movement which has been determined in step S43 to be tilted. The direction at this time is referred to as a "positive direction". In other words, the motor vehicle rolls backward in the "positive direction". Specifically, the positive direction includes the cases: where the path changes from a horizontal plane or a downhill to an uphill in front; where the path changes from a downhill to an uphill in front; where the path changes from a downhill to a horizontal plane in front; where an uphill becomes steeper in front; and where a downhill becomes more gentle in front. In this example, assume that the front end of the vehicle body is located below the current position, when the motor vehicle moves forward onto the plane of movement which has been determined in step S43 to be tilted. The direction at this time is referred to as a "negative direction". In other words, the motor vehicle rolls forward in the "negative direction". Specifically, the negative direction includes the cases: where the path changes from an uphill to a horizontal plane or a downhill in front; where the path changes from a horizontal plane to a downhill in front; where a downhill becomes steeper in front; and where the an uphill becomes gentler in front. That is, the plane is tilted in the positive direction in the example shown in FIG. 2B, and in the negative direction in the example shown in FIG. 2C. In the case of the positive direction, the processing proceeds to step S45. In the case of the negative direction, the processing proceeds to step S46.

In (S45), region changer 13 shifts the target area for the image recognition processing upward. The processing proceeds to step S47.

In (S46), region changer 13 shifts the target area for the image recognition processing downward. The processing proceeds to step S47.

In (S47), region changer 13 determines whether or not there is a cause of reliability degradation of the image recognition processing.

For example, region changer 13 further determines whether or not the degree of the tilt determined in step S43 is within a predetermined range. If the degree is within the predetermined range (i.e., No in S47), the procedure of determining the processing target area ends. If the degree of the tilt is out of the predetermined range (Yes in S47), the processing proceeds to step S48.

For example, region changer 13 may determine whether or not the speed of the motor vehicle obtained by information processing device 10 in step S40 is within a predetermined range. If the speed of the vehicle is within the predetermined range (No in S47), the procedure of determining the processing target area ends. If the speed of the vehicle is out of the predetermined range (Yes in S47), the processing proceeds to step S48.

For example, region changer 13 may determine whether or not the brightness around the motor vehicle obtained by information processing device 10 in step S40 is lower than or equal to a predetermined illuminance. If the brightness is higher than the predetermined illuminance (No in S47), the procedure of determining the processing target area ends. If the brightness is lower than or equal to the predetermined illuminance (Yes in S47), the processing proceeds to step S48.

In (S48) region changer 13 increases the target area for the image recognition processing.

An example the procedure of the processing on the inputs to information processing device 10 has been described. This processing is implemented by the constituent elements of information processing device 10 executing respective functions.

Although not included in the example described above for easier understanding of the overview of the procedure, this processing with information processing device 10 may include a step of determining the amount of shift (or position) of the processing target area according to the degree of the tilt, if the answer is Yes in step S43. The processing may include a step of determining the magnification of the processing target area in accordance with the degree of the tilt, the speed of the vehicle, or the illuminance, if the answer is Yes in step S47. In addition, the processing may include the following steps, if the answer is Yes in step S47. In one step, processing cycle changer 15 may lengthen the cycle of the image recognition processing by object detection processor 14. In another step, speed change notifier 16 may provide the user with information on a change in the cycle of this image recognition processing. If there is no tilt (i.e., No in S43), the determination on whether or not there is a cause for reliability degradation (i.e., S47) may be executed. If there is a cause (Yes in S47), for example, the processing target area may be increased in at least one of the upward and downward directions of the picture with the central position of the processing target area in the picture unchanged.

Figure 6A:
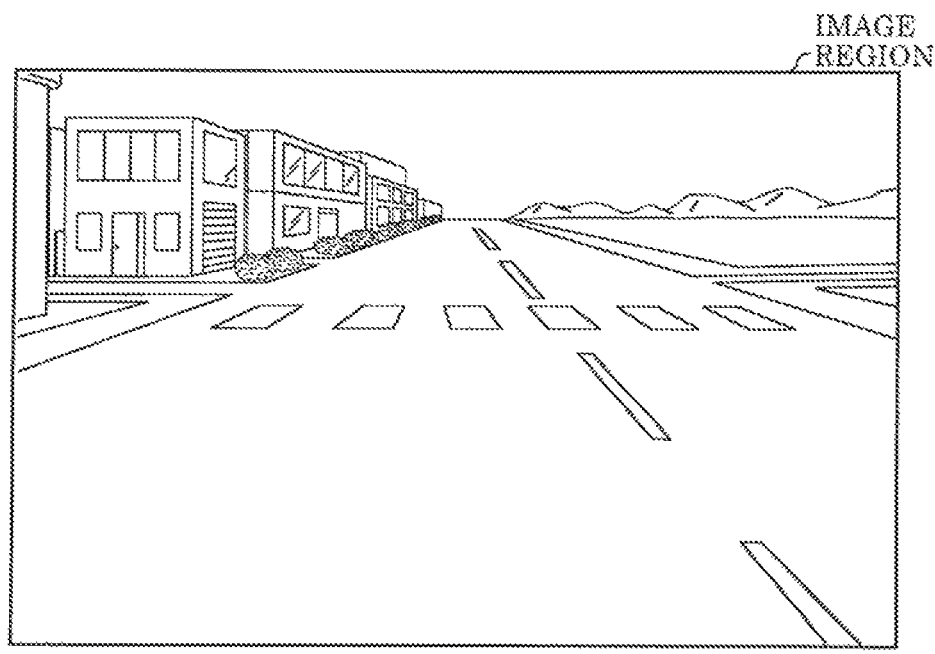
FIG. 6A is a schematic diagram showing another example picture captured in front of the path of the moving object and input to the information processing device.
Figure 6B:
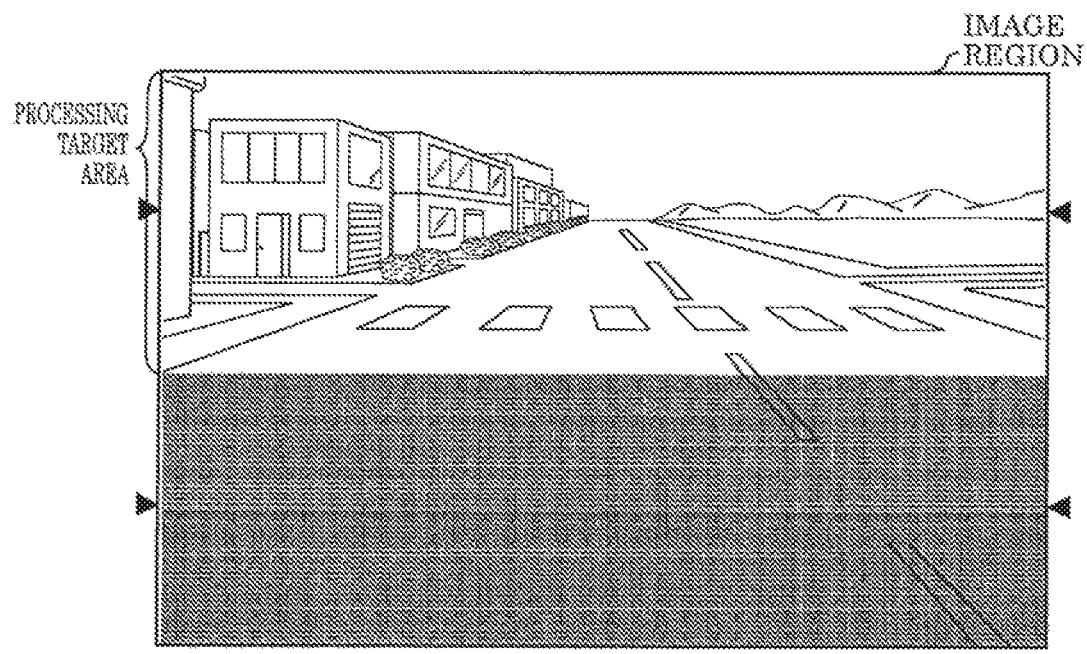
FIG. 6B is a schematic diagram showing an example where the processing target area is shifted upward as compared to the picture shown in FIG. 6A.
Figure 7A:
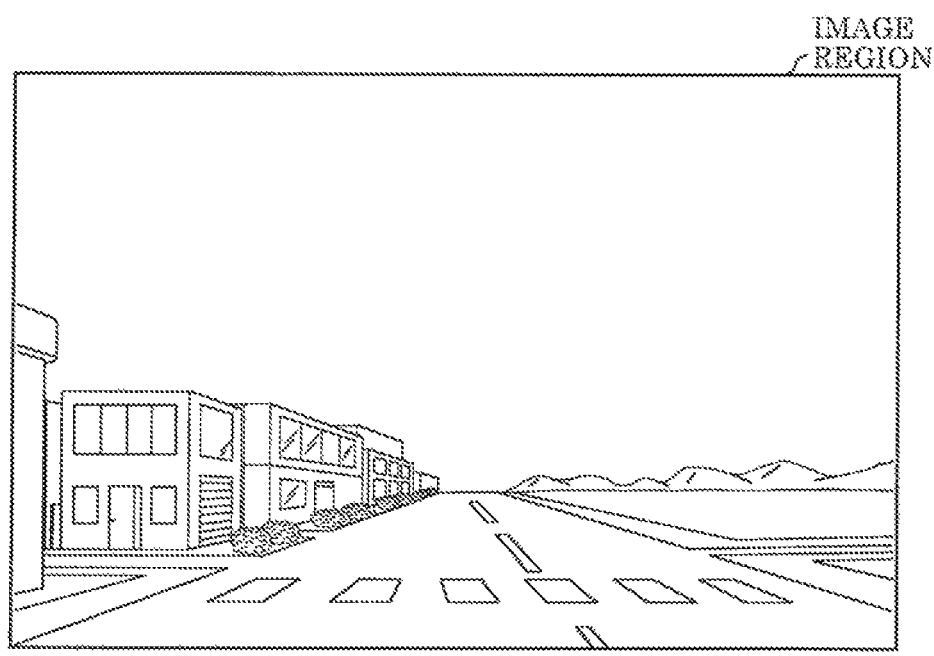
FIG. 7A is a schematic diagram showing another example picture captured in front of the path of the moving object and input to the information processing device.
Figure 7B:
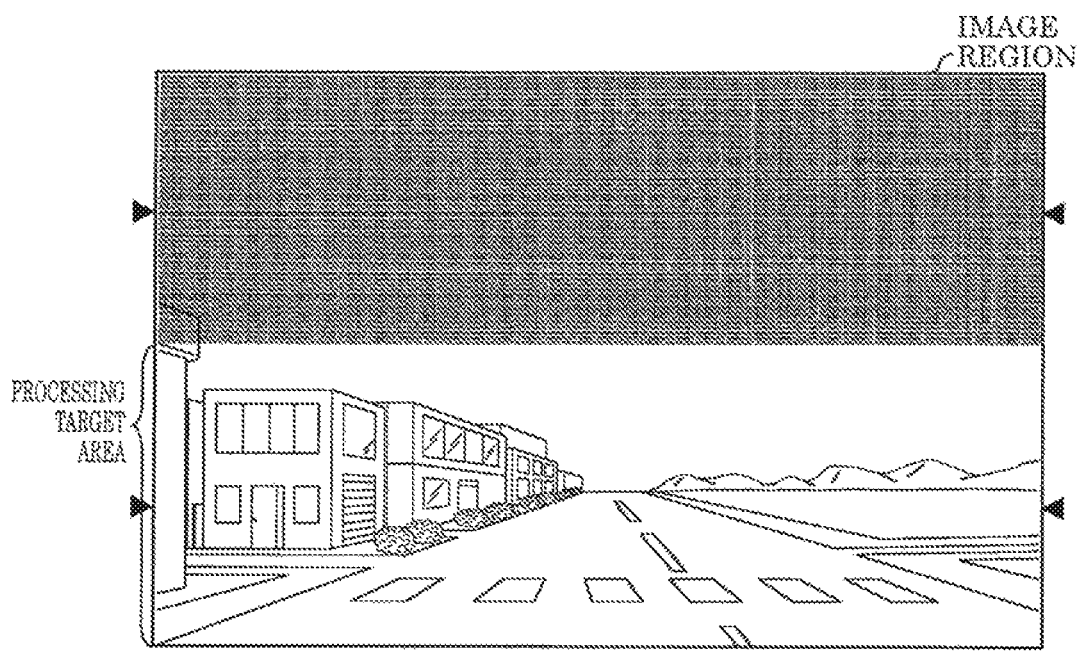
FIG. 7B is a schematic diagram showing an example where the processing target area is shifted downward as compared to the picture shown in FIG. 7A.

Now, the target area for the image recognition processing, which is shifted in a step subsequent to step S44 in accordance with the result of determination in step S44, will be described using an example. FIG. 6A is a schematic diagram showing an example picture indicated by the third sensor data input from the in-vehicle camera to information processing device 10, if the tilt is in a positive direction. FIG. 6B is a schematic diagram showing an example processing target area shifted upward in step S45 in the entire region of the picture shown in FIG. 6A. On the other hand, FIG. 7A is a schematic diagram showing an example picture indicated by the third sensor data input from the in-vehicle camera to information processing device 10, if the tilt is in a negative direction. FIG. 7B is a schematic diagram showing an example processing target area shifted downward in step S46 in the entire region of the picture shown in FIG. 7A. In the example of the motor vehicle, it is not realistic that the presence/absence of the tilt or the direction of the tilt differs in a single place. As a simulation showing that the range included in the processing target area of the picture can be approximated by changing the position of the processing target area in accordance with the tilt, the example pictures in FIGS. 6A, 6B, 7A and 7B show the scene of the same place as in the example pictures in FIGS. 5A and 5B.

For example, in FIG. 5B, assume that the processing target area includes the scene at a certain distance in front of the path of the motor vehicle, and that an image of an object may be present on and around the path in the scene at a distance to be detected for determination on the details of the control for driver assistance or autonomous driving. This scene appears in almost the same manner in the processing target areas shifted in accordance with the tilt in FIGS. 6B and 7B. Even if the plane of movement in front of the path of the motor vehicle is tilted with respect to the own orientation, a result of object detection can be provided which is suitably used for determination on the details of the control for driver assistance or autonomous driving. In FIGS. 6B and 7B, four triangles on the right and left sides of the image region indicate four corners of the processing target area in a position unchanged in accordance with the tilt. In FIG. 6B, the processing target area in the unchanged position includes a closer view than the processing target area in a changed position, and lacks a farther view than the processing target area in the changed position. In FIG. 7B, the processing target area in the unchanged position includes a larger amount of sky, in which the detection target object cannot be present, above buildings. The area lacks a part of the area, which is included in the processing target area of FIG. 5B and in which a detection target object can be present on and around the path of the motor vehicle. Even if these unchanged processing target areas are subjected to image recognition processing, a result of object detection cannot be provided which is suitably used for the determination on the details of the control for driver assistance or autonomous driving.

In this manner, information processing device 10 excludes a part of the target area for the image recognition processing within the region of the picture captured by the in-vehicle camera to reduce the amount of calculation. In addition, information processing device 10 changes the position of this processing target area in the image region in accordance with the tilt of the plane of movement in front of the path of the moving object with respect to the own orientation. As a result, the object detection utilizing the result of the determination on the details of the control for driver assistance or autonomous driving can be executed within a suitable range in the direction of travel.

Variations and Supplemental Information

The information processing device, the program, and the information processing method according to one or more aspect the present disclosure are not limited to the embodiment described above. The present disclosure includes other embodiments, such as those obtained by variously modifying the embodiment as conceived by those skilled in the art without departing from the scope and spirit of the present disclosure. Example variations and supplemental information for explaining the embodiment will be described.

(1) An example has been described where the moving object is a motor vehicle. The technique according to the present disclosure is applicable to various types of moving objects other than a motor vehicle. For example, the technique is also applicable to passenger transport vehicles such as railway vehicles and other vehicles, ships, and aircrafts traveling on tracks, in addition to the motor vehicles. The technique according to the present disclosure is also applicable to moving objects, such as drones, not for passenger transport. Out of these moving objects, the moving objects such as ships, aircrafts, and drones, do not travel on a road surface. The plane of movements in front of the paths of such moving objects are regarded not as imaginary planes approximated to the road surface as described above, but as estimated tracks of the surfaces of the moving objects traveling, for example, along preset paths. The motor vehicle according to the present disclosure conceptionally includes two- or three-wheel motor vehicles and continuous track vehicles.

Figure 8:
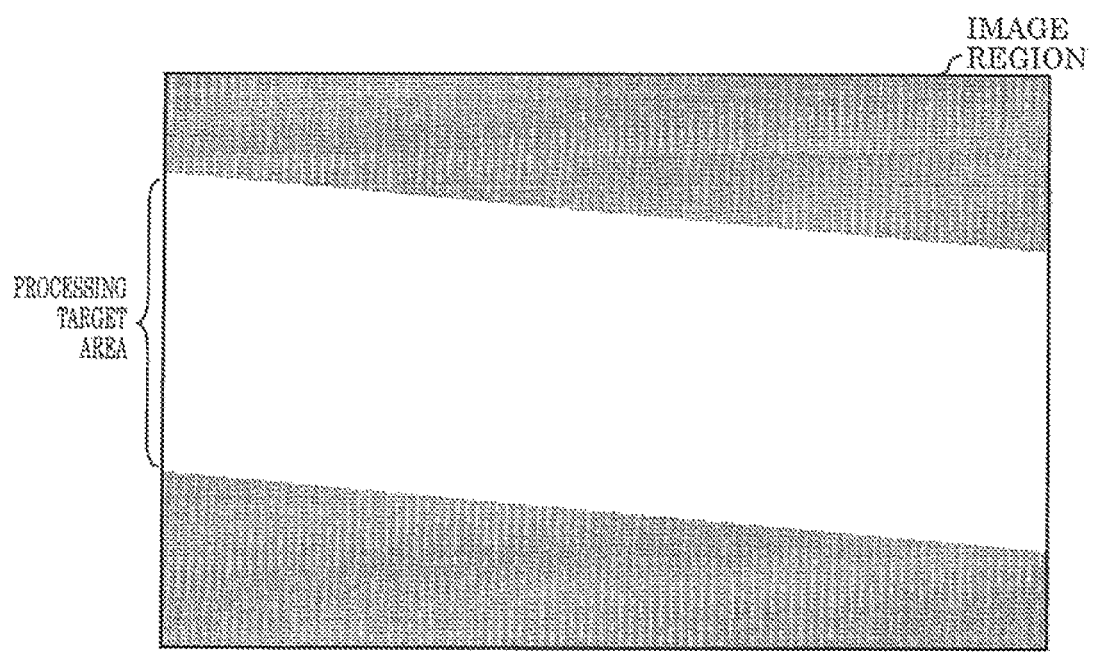
FIG. 8 is a schematic diagram showing an example where the processing target area is determined, if the direction (i.e., the tilt) of the plane of movement with respect to an "own orientation" is represented by a roll angle.

(2) The tilt of the plane of movement in front of the path of the moving object with respect to the own orientation described above in the embodiment represents only the tilt that can be expressed by a rotation (i.e., pitch) angle about the transverse axis with respect to the straight-ahead direction of the moving object. The application of the technique according to the present disclosure is not limited thereto. The technique according to the present disclosure is also applicable to the determination on or a change in the processing target area according to the tilt that can be expressed by a rotation (i.e., roll) angle about the straight-ahead axis of the moving object. FIG. 8 is a schematic diagram showing an example processing target area determined if the plane of movement in front of the path of the moving object is inclined clockwise with respect to the own orientation. As can be seen from FIG. 8, in this case, the processing target area is also determined to cover the area obtained by clockwise rotation of the processing target area illustrated in FIG. 5A. The technique according to the present disclosure is also applicable to the case where the tilt of the plane of movement in front of the path of the moving object with respect to the own orientation is expressed by a combination of pitch and roll angles. In this case, the position of a white, parallelogram processing target area shown in FIG. 8 comes closer to the top or bottom of the image region.

(3) In the embodiment, an example has been described where the tilt of the plane of movement in front of the path of the moving object with respect to the own orientation is caused by a change in the slope of the road surface along the landscape. The present disclosure is not limited thereto. For example, in a case of a ship or a drone, this tilt may be caused by an external force such as a water or air resistance, waves, or wind, for example. A traveling helicopter or drone has an orientation tilted with respect to the direction of travel on the principle of operation. This tilt may be caused by the own orientation changed by the number of occupants in the moving object, the weight or location of the mounted luggage. The technique according to the present disclosure is also useful to address such a tilt.

(4) In the embodiment, an example has been described where the picture captured by the in-vehicle camera is, for easier illustration and understanding, an image as if captured with a typical lens with less distortion of the shape of an object image. The application of the technique according to the present disclosure is not limited thereto. The technique according to the present disclosure may employ a combination of pictures captured by a lens classified as a wide- or super-wide-angle lens and by a fisheye lens. In this case, the image of an object is in significantly different shapes between the case where the object is captured around the center of the picture and on the periphery of the picture. For image recognition suitable for such variations of the shapes of the image, object detection processor 14 may contain a plurality of trained models. The processor may change the trained models specialized in image recognition in the positions, for example, in accordance with the position of the processing target area in the entire image region and execute the image recognition.

(5) The embodiment has been described using an example where the third sensor data is image data output the image sensor. The third sensor data is however not limited to the image data. The technique according to the present disclosure is also applicable to other types of data indicating the position of the object in a space, for example, point cloud data output from a LiDAR.

(6) Each trained model may be a multilayer neural network. In this case, processing of bounding boxes with different sizes is executed among intermediate layers of a trained model. In this case, the bounding boxes of the intermediate layers may be in sizes suitable for detecting the image of the detection target object present at predetermined distances from the moving object (e.g., the third sensor, such as a camera, placed in the moving object). For example, the bounding box of the third intermediate layer from the input layer is suitable for detecting a pedestrian at a distance of 30 m. The bounding box of the fifth intermediate layer is smaller and suitable for detecting a pedestrian at a distance of 80 m. In this manner, assume that the distance from the moving object (or the third sensor) to the tilt of the plane of movement in front of the path with respect to the own orientation is known, and that the distances from the moving object (or the third sensor) suitable for the layers of the trained model are also known. The determination on the processing target area according to the tilt may be executed by selecting an area according to a layer which is, among the layers of the trained model, more suitable for a range further ahead of a starting point of a tilt of the plane of movement in front of the moving object with respect to the own orientation.

(7) The embodiment has been described using an example where the tilt of the plane of movement in front of the path of the moving object with respect to the own orientation is determined based on both the first sensor data and the second sensor data (e.g., in step S43 of FIG. 4). This determination may employ only one of the first sensor data and the second sensor data. For example, a result determination on a road surface region obtained by performing segmentation on the image data which is the first sensor data may be used. If there is any pixel determined as a road surface region in a size larger than or equal to a predetermined size above a certain region including a horizontal road surface, the tilt may be determined as positive. Alternatively, if there is any pixel determined as a road surface region in a size smaller than or equal to a predetermined size below the certain region, the tilt may be determined as negative. For example, a stereo camera may obtain, as the first sensor data, for example, data on a depth image in front of the path of the moving object. The determination may be executed based on the tilt calculated from a change in the distance to the road surface included in this depth image. For example, the tilt at a roll angle may be determined based on the directions of the image region with a vertical or horizontal component included in the image data which is the first sensor data and captured in front of the moving object. For example, if there is available three-dimensional map information, this determination may be executed using this three-dimensional map information and data (i.e., the second sensor data) output from a positioning system and indicating the current position of the moving object. In addition, this determination may be executed using a machine learning model trained to determine the tilt of the plane of movement with respect to the own orientation based on the image data which is the first sensor data.

(8) In the embodiment, an example has been described where the plane of movement is flat. The plane of movement may have steps. For example, the slope of the steps may be calculated based on the point cloud information obtained by a LiDAR. The tilt of the plane of movement with respect to the orientation of the moving object may be calculated based on the calculated slope and the orientation of the moving object.

(9) In the embodiment, an example has been described where the moving object is the device equipped with the third sensor that outputs sensor data used for object detection processing. The device may be stationary and include a movable part that includes at least the third sensor and has a movable orientation. For example, the device may be a monitoring camera system including a camera with a movable orientation. In such a device, the conception of the plane of movement used in the embodiment is replaced with the conception of various surfaces, such as a floor surface (including the ground or the surfaces of stair or escalator steps), wall surfaces, or a ceiling, included in the sensing area of the third sensor. The conception of the own orientation may be replaced with the conception of the orientation of the third sensor or the movable part.

(10) Some or all of the constituent elements of the information processing device described above may serve as a single system large-scale integrated (LSI) circuit. The system LSI circuit is a super multifunctional LSI circuit manufactured by integrating a plurality of components on a single chip, and specifically is a computer system including a microprocessor, a read-only memory (ROM), and a random-access memory (RAM), for example. The ROM stores a computer program. The microprocessor operates in accordance with this computer program so that the system LSI circuit fulfils the function.

Note that the system LSI circuit has been named here, but may be replaced with an "integrated circuit (IC)", "large-scale integrated (LSI) circuit", a "super-large-scale integrated (super LSI) circuit", or an "ultra-large-scale integrated (ultra LSI) circuit", depending on the degree of integration. The circuit integration is not limited to the LSI and may be implemented by a dedicated circuit or a general-purpose processor. A field-programmable gate array (FPGA) programmable after manufacturing the LSI system, or a reconfigurable processor capable of reconfiguring connection or setting of circuit cells inside the LSI may be used.

Such a system LSI circuit, for example, may be incorporated into various in-vehicle systems such as a digital camera, a mobile information terminal, such as a smartphone, equipped with a camera, a back-monitor system, or an advanced driver-assistance system with an object detection function.

Appearing as an alternative circuit integration technology to the LSI, another technology that progresses or deprives from the semiconductor technology may be used for integration of functional blocks. Application of biotechnology can be considered.

(11) Each constituent element of the information processing device described above includes a processor and a memory, for example. A plurality of communicative computers may operate in cooperation and serve as constituent elements of an information processing system that provides functions similar to those of the information processing devices described above. In this case, for example, these constituent elements are achieved by some or all of the processors included in these computers executing one or more programs stored in some or all of the memories included in these computers.

(12) One aspect of the present disclosure is directed not only to the information processing device described above but may be directed to an information processing method including, as steps, the characteristic functional constituent elements included in the information processing device. This information processing method is, for example, the information processing method described above with reference to the flow chart of FIG. 4. One aspect of the present disclosure may be a computer program that causes a computer to execute the characteristic steps included in such an information processing method. One aspect of the present disclosure may be a non-transitory computer-readable recording medium storing such a computer program.

INDUSTRIAL APPLICABILITY

The technique according to the present disclosure is widely useful for information processing for image recognition using sensor data. For example, the technique is used for, for example, object detection around a moving object traveling through driver assistance or autonomous moving and in the direction of travel.

What is claimed is:

1. An information processing device, comprising:
a processor, wherein
the processor:
obtains at least one of first sensor data output from a first sensor and used to determine an ambient environment of a device in which a third sensor is placed, and second sensor data output from a second sensor and used to determine an orientation of the device;
determines a tilt of a plane in a sensing direction of the third sensor with respect to the orientation based on the at least one of the first sensor data and the second sensor data obtained;
determines, in accordance with the tilt, a processing target area of third sensor data output from the third sensor and used for object detection processing in the sensing direction;
executes the object detection processing using the processing target area of the third sensor data;
determines a part of the third sensor data as the processing target area, if the tilt is within a predetermined range;
determines a part wider than the part of the third sensor data as the processing target area, if the tilt is out of the predetermined range; and
makes a processing cycle of the object detection processing longer in a case where the tilt is out of the predetermined range than in a case where the tilt is within the predetermined range.

2. The information processing device according to claim 1, wherein
the device is a moving object, and
the processor requests the moving object for deceleration, if the tilt is out of the predetermined range.

3. The information processing device according to claim 1, wherein
the device is a moving object, and
the processor issues an alert to a user of the moving object, if the tilt is out of the predetermined range.

4. The information processing device according to claim 1, wherein
a size of the processing target area is changed in accordance with a factor influencing a reliability of the object detection processing.

5. The information processing device according to claim 1, wherein
the object detection processing is executed by inputting the processing target area into one or more trained models.

6. The information processing device according to claim 5, wherein
the one or more trained models are a plurality of trained models, and
the processor selects one of the plurality of trained models in accordance with the tilt, and inputs the processing target area into the one selected.

7. The information processing device according to claim 5, wherein
each of the trained models is a multilayer neural network, and
the processor:
obtains a distance from the device to a starting point of the tilt; and
determines the processing target area for a layer of the trained model according to the distance.

8. The information processing device according to claim 1, wherein
the processor determines the processing target area by shifting the processing target area in accordance with the tilt.

9. A non-transitory computer-readable recording medium having recorded thereon a computer program, which when executed by a computer, causes the computer to execute a method including:
obtaining at least one of first sensor data output from a first sensor and used to determine an ambient environment of a device in which a third sensor is placed, and second sensor data output from a second sensor and used to determine an orientation of the device,
determining a tilt of a plane in a sensing direction of the third sensor with respect to the orientation based on the at least one of the first sensor data and the second sensor data obtained,
determining a processing target area of third sensor data output from the third sensor and used for object detection processing in the sensing direction in accordance with the tilt,
executing the object detection processing using the processing target area of the third sensor data,
determining a part of the third sensor data as the processing target area, if the tilt is within a predetermined range;
determining a part wider than the part of the third sensor data as the processing target area, if the tilt is out of the predetermined range; and
making a processing cycle of the object detection processing longer in a case where the tilt is out of the predetermined range than in a case where the tilt is within the predetermined range.

10. An information processing method using a processor, the method comprising:
obtaining at least one of first sensor data output from a first sensor and used to determine an ambient environment of a device in which a third sensor is placed, and second sensor data output from a second sensor and used to determine an orientation of the device;

determining a tilt of a plane in a sensing direction of the third sensor with respect to the orientation based on the at least one of the first sensor data and the second sensor data obtained;

determining a processing target area of third sensor data output from the third sensor and used for object detection processing in the sensing direction in accordance with the tilt;

executing the object detection processing using the processing target area of the third sensor data;

determining a part of the third sensor data as the processing target area, if the tilt is within a predetermined range;

determining a part wider than the part of the third sensor data as the processing target area, if the tilt is out of the predetermined range; and making a processing cycle of the object detection processing longer in a case where the tilt is out of the predetermined range than in a case where the tilt is within the predetermined range.

* * * * *

UNITED STATES PATENT AND TRADEMARK OFFICE
CERTIFICATE OF CORRECTION

PATENT NO. : 11,341,670 B2
APPLICATION NO. : 16/902763
DATED : May 24, 2022
INVENTOR(S) : Yohei Nakata It is certified that error appears in the above-identified patent and that said Letters Patent is hereby corrected as shown below:

On the Title Page

In item (56) Reference Cited, under U.S. Patent Documents, please add the following information:
2019/0362162 A1    11/2019    Averbuch    G06K 9/0798

Signed and Sealed this
Ninth Day of August, 2022

Katherine Kelly Vidal
*Director of the United States Patent and Trademark Office*